Figure 1:
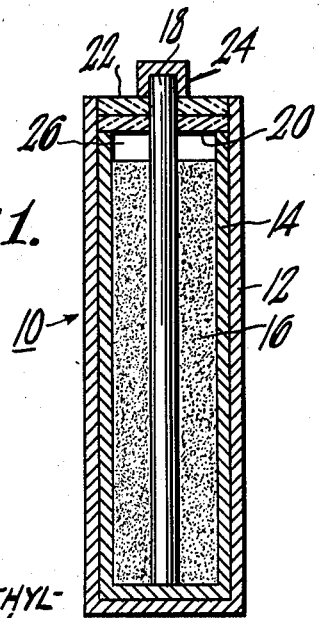

INVENTORS
Clarence K. Morehouse
& Richard Glicksman
BY
ATTORNEY

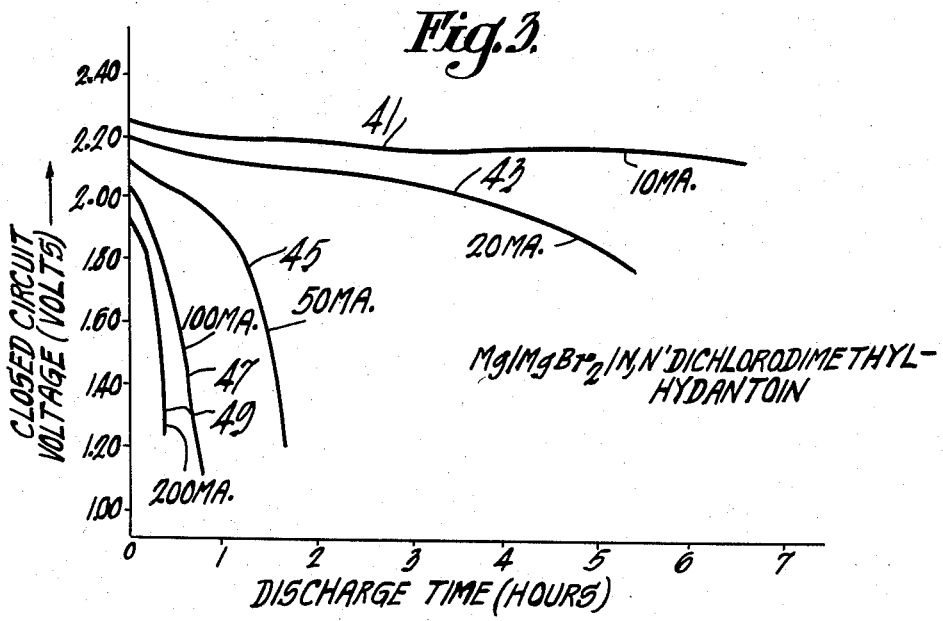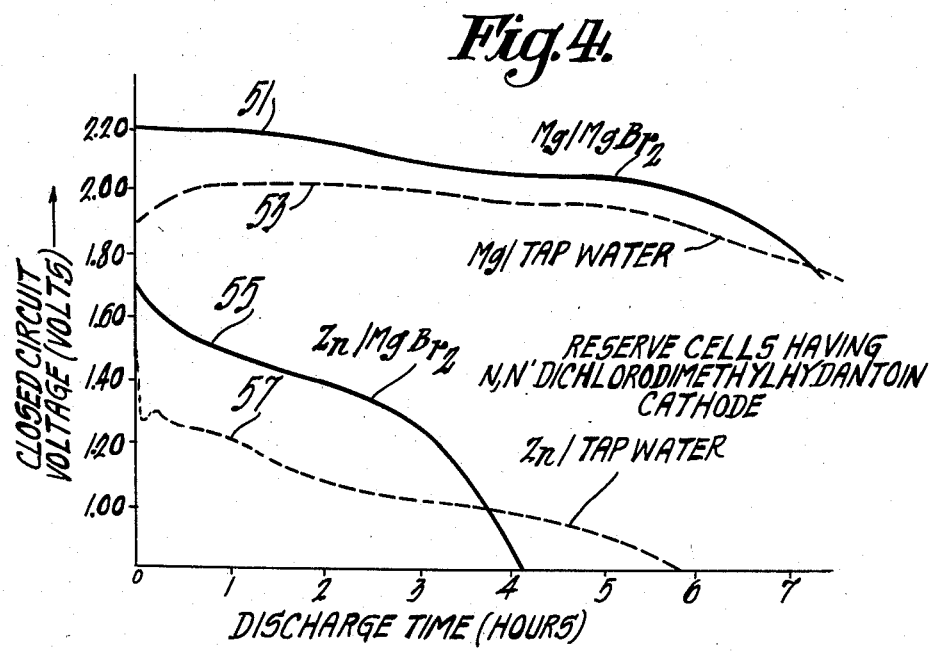

INVENTORS
Clarence K. Morehouse
& Richard Glicksman
BY
ATTORNEY

United States Patent Office 2,874,204
Patented Feb. 17, 1959

2,874,204

PRIMARY CELLS

Clarence K. Morehouse, Princeton, and Richard Glicksman, Highland Park, N. J., assignors to Radio Corporation of America, a corporation of Delaware Application June 13, 1956, Serial No. 591,195

13 Claims. (Cl. 136—100)

This is a continuation-in-part of U. S. patent application, S. N. 466,076, filed November 1, 1954, by C. K. Morehouse and R. Glicksman (now abandoned).

This invention relates to primary cells, and particularly, but not necessarily exclusively, to improved primary cells including a magnesium anode and a cathode comprising a positive halogen organic compound.

Primary cells are electrochemical devices from which stored chemical energy is converted directly into electrical energy by an electrochemical process. Generally, the term primary cells refers to a class of cells that do not have efficiently reversible chemical reactions. Once the chemical energy is converted to electrical energy, the cells are discarded. Primary cells that are manufactured to include a non-spillable electrolyte are referred to as dry cells. Primary cells that are assembled without one of the essential components, such as the electrolyte, but are adapted to supply electrical energy when the component is added just prior to use, are referred to as reserve cells.

A primary cell which is to be used as a portable power supply should have the following characteristics: a high watt-hour and a high ampere-hour capacity per unit of volume or weight; a high flat operating voltage over a wide range of current drains; a long life; and a low cost.

One problem in present day primary cells is that they include materials which come into short supply in times of emergency because they become critical to the interests of the United States as a whole. These materials may become critical because they are supplied from foreign sources or because domestic ore sources are limited in size and mining capacity, or for some other economic reason.

Accordingly, an object of this invention is to provide primary cells which are comparatively inexpensive to manufacture, have a high watt-hour and a high ampere-hour capacity per unit of volume or weight, and a relatively high flat operating voltage level over a wide range of current drains.

A further object is to provide an improved electrochemical system which may be employed in primary cells.

Another object is to provide improved primary cells including materials which are non-strategic, can be readily available in large quantities in the United States, and are comparatively inexpensive.

In general the foregoing objects are accomplished in improved primary cells of the invention which include an anode selected from the group consisting of magnesium and magnesium-base alloys and a cathode including an organic oxidizing substance in which the oxidizing properties are due at least in part to positive halogens chemically combined in said substance. The invention includes reserve cells including the above-described combination and adapted to be used to supply electrical energy upon the addition of an electrolyte.

Figure 2:
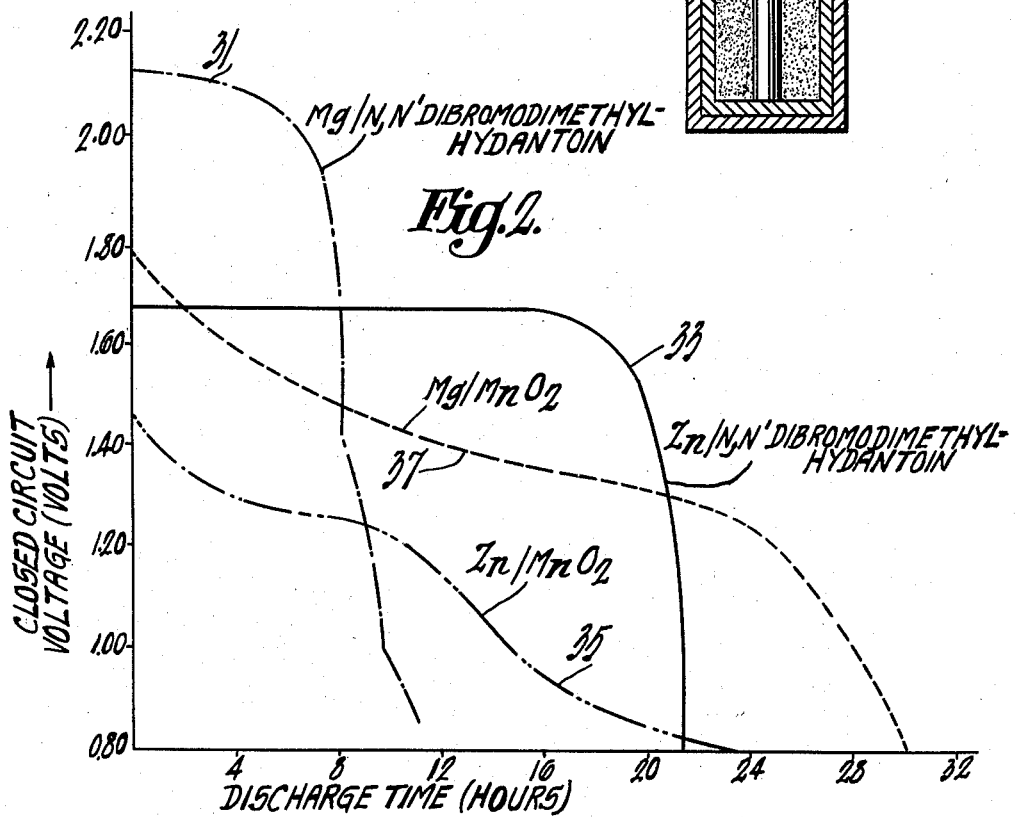
Figure 5:
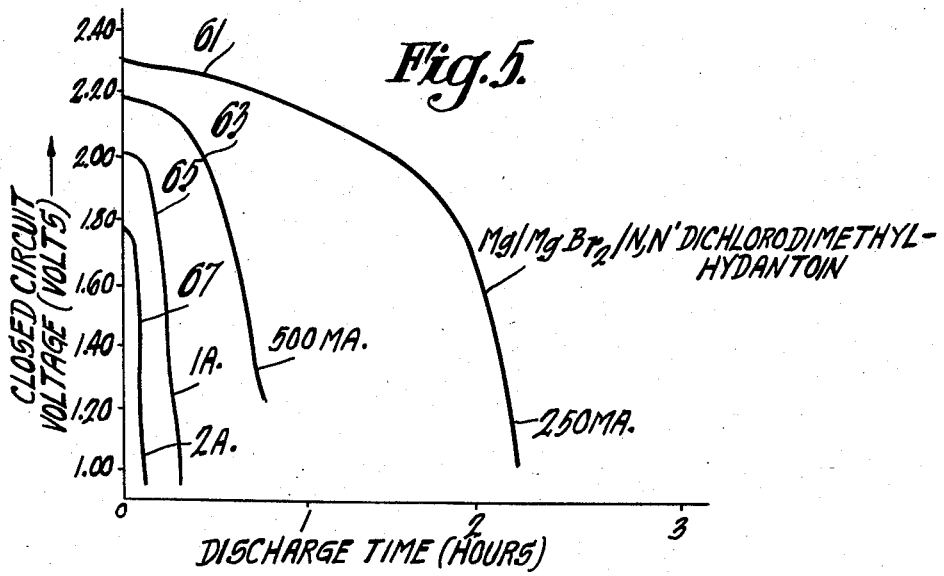
Figure 6:
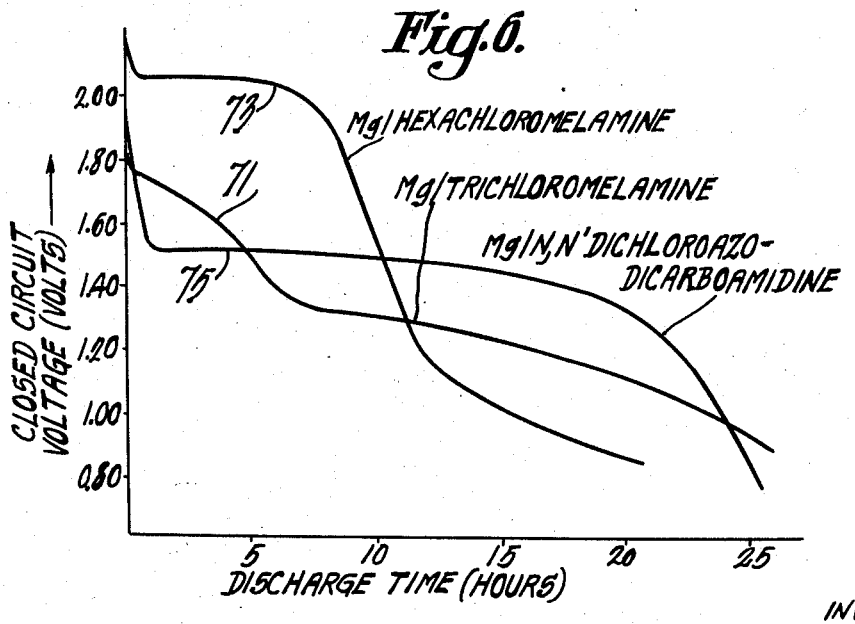

The invention is described in greater detail by reference to the drawings wherein:

Figure 1 is a sectional, elevational view of a typical dry cell of the invention, Figure 2 is a family of curves showing the change in cell voltage with respect to discharge time of an "AA" size dry cell of the invention compared with comparable dry cells from other electrochemical systems when discharged continuously through a 50 ohm resistance, Figure 3 is a family of curves illustrating the discharge characteristics of a reserve cell of the invention under various discharge rates, Figure 4 is a family of curves comparing the reserve cell of Figure 3 with similar cells having a zinc anode, Figure 5 is a family of curves illustrating the discharge characteristics of a primary cell of the invention under various discharge rates, and Figure 6 is a group of curves illustrating the discharge characteristics of several dry cells of the invention.

*Example 1.*—Referring to Figure 1, a cell according to the invention may be prepared as follows. A metallic anode 12 is provided in the form of a cup of the standard "AA" size (American Standards Association, Bureau of Standards, Washington, D. C.). The anode 12 has the approximate composition 95.6% magnesium, 3.0% aluminum, 1.0% zinc, 0.2% manganese, and 0.15% calcium. This alloy composition is sometimes designated AZ31X. The anode 12 is lined with a separator 14 comprising an absorbent raft paper. The separator 14 keeps the anode 12 and a cathode 16 apart while providing therebetween a low resistance path to the flow of ions during the electrochemical process.

A mix including the cathode material and electrolyte, hereinafter referred to as the cathode mix, is prepared of the following constituents:

100 grams N,N' dibromodimethylhydantoin
50 grams graphite
50 grams acetylene black
6 grams barium chromate
180 ml. distilled water containing 0.2 g./liter of sodium dichromate Approximately 5 grams of the cathode mix is formed to a cylindrical slug and inserted into the paper lined anode 12 to form a cathode 16. A carbon rod 18 is inserted into the cathode mix 16 to provide electrical connection thereto. The anode 12 is sealed with an insulating washer 20 mounted on the carbon rod and a layer 22 of hard wax on the washer 20. A metal contact cap 24 of brass is placed on rod 18. An air space 26 is provided between the washer 20 and the cathode 16.

The anode and cathode may now be connected through an external load whereby the cell commences to be discharged by electrochemical action. The cell reactions are believed to occur as follows:

A. CATHODE REACTION

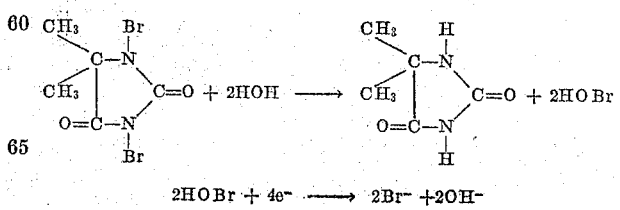

$$2HOBr + 4e^- \longrightarrow 2Br^- + 2OH^-$$

B. ANODE REACTION $$2Mg \longrightarrow 2Mg^{++} + 4e^-$$

C. OVERALL CELL REACTION

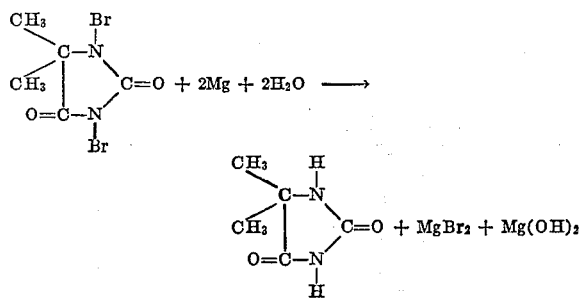

Figure 2 shows characteristic initial discharge curves for "AA" size dry cells discharged continuously through a 50 ohm load resistance (simulating the current drain requirements of a transistor operated portable radio). Curve 31 shows the characteristic discharge curve for a cell prepared according to Example 1 containing N,N' dibromodimethylhydantoin as the cathode material and a magnesium anode, magnesium/N,N' dibromodimethylhydantoin, curve 33 shows the discharge curve for a similar zinc/N,N' dibromodimethylhydantoin cell discharged under the same conditions. For comparison, curve 35 shows the characteristic discharge curve for a similar commercially-available zinc/manganese dioxide cell discharged under the same conditions and curve 37 shows the characteristic discharge curve data for a similar magnesium/manganese dioxide cell. The dry cell of Example 1 operates at a considerably higher voltage than the comparable zinc/manganese dioxide dry cells. It should also be noted that the cell of Example 1 has a desirable high flat voltage curve.

In addition to its favorable performance, the cell of Example 1 has the great advantage that it employs non-strategic, plentiful materials which are relatively easy to manufacture in the United States, and when manufactured in large quantities, should be relatively inexpensive. Magnesium may be obtained from sea water and the N,N' dibromodimethylhydantoin may be produced synthetically.

The primary cells of the invention comprise generally the following parts:

(1) An anode selected from the group of materials consisting of magnesium and magnesium-base alloys,
(2) an electrolyte which may include (a) a soluble substance for increasing the electrical-conductivity thereof and (b) a material for inhibiting the corrosion of the anode,
(3) a cathode including a depolarizer consisting of an organic oxidizing substance in which the oxidizing properties thereof are due at least in part to chemically combined positive halogens. The cathode may include also an inorganic depolarizer, other organic depolarizer and/or an inorganic material for increasing the conductivity of the cathode.

*The anode.*—The anode for the primary cells of the invention may be magnesium or magnesium-base alloys. The term "magnesium anode" includes both magnesium and magnesium-base alloy anodes. A magnesium-base alloy is one wherein the predominant ingredient is magnesium. Thus, any alloy having more than 50% magnesium is satisfactory. It is preferred, however, to have as high a proportion of magnesium as possible. Other ingredients are added to magnesium to improve the properties of the anode for fabrication purposes, to impart a greater degree of corrosion resistance, or for other reasons. Table I sets forth examples of magnesium-base alloys which are suitable for anode material together with the corresponding ASTM designations.

Table I

ANODE COMPOSITIONS

| Alloy No. | A.S.T.M. Designation | Nominal Composition [1] | | | | | |
|---|---|---|---|---|---|---|---|
| | | Al | Mn | Zn | Zr | Ce | Ca |
| 1 | A3 | 3.0 | 0.2 | | | | |
| 2 | A4 | 4.0 | 0.2 | | | | |
| 3 | A8 | 8.0 | 0.1 | | | | |
| 4 | A10 | 10 | 0.1 | | | | |
| 5 | A12 | 12 | 0.1 | | | | |
| 5a | AZ10A | 1.0 | | 0.5 | | | 0.10 |
| 6 | AZ31 | 2.8 | 0.3 | 1.0 | | | |
| 6a | AZ31X | 3.0 | 0.2 | 1.0 | | | 0.15 |
| 7 | AZ33 | 3.0 | 0.2 | 3.0 | | | |
| 8 | AZ61 | 6.5 | 0.2 | 0.7 | | | |
| 9 | AZ63 | 6.0 | 0.2 | 3.0 | | | |
| 10 | AZ81 | 8.5 | 0.2 | 0.5 | | | |
| 11 | AZ91 | 9.0 | 0.2 | 0.6 | | | |
| 12 | AZ92 | 9.0 | 0.1 | 2.0 | | | |
| 13 | E6 | | | | | 6.0 | |
| 14 | EM42 | | 2.0 | | | 4.0 | |
| 15 | EM62 | | 2.0 | | | 6.0 | |
| 16 | M1 | | 1.5 | | | | |
| 17 | M2 | | 2.0 | | | | |
| 18 | ZK30 | | | 3.0 | 0.7 | | |
| 19 | ZK60 | | | 6.0 | 0.7 | | |
| 20 | Z1 | | | 1.0 | | | |

[1] Balance commercial magnesium.

The magnesium anode may be the container for the cell, may be the lining of the container, or may be a separate structure inserted in the container. The magnesium anode may be in any geometrical configuration desired.

In Example 1, a paper separator lined the magnesium anode cup 12. It is necessary to space the cathode from the anode. To accomplish this, it is preferred to insert a separator between the anode and the cathode regardless of configuration, although other methods of spacing may be used. The separator may be any porous material such as kraft paper, kraft paper treated with a gel-like material such as carboxymethyl cellulose, polyvinyl alcohol, or a starch-flour gel. The coating on the kraft paper promotes adhesion of the paper to the anode and maintains good electrical contacts between the electrolyte and the anode. Porous ceramics or other inorganic or organic structures may be used in place of paper.

*The electrolyte.*—The electrolyte may be distilled water, or water containing a soluble salt such as sea water, or water to which one or more soluble salts have been deliberately added. Bromides of alkali metals, alkaline earth metals, and ammonium cations are the most desirable soluble salts in the electrolyte. The electrolyte may be prepared by dissolving the hydrated salt in water in a concentration between about 30 grams per liter and that producing a saturated solution at ordinary temperatures. The concentration does not appear to be critical, although for best results certain concentrations are preferred depending upon the particular salt or combination of salts that are used. For example, preferred concentrations of the alkaline earth metal bromides (hydrated) are from about 150 to 600 grams, preferably 500 grams, of the hydrated salt per liter of water. While a single salt may be used as the electrolyte, combinations of salts, particularly combinations of alkali metal bromides are desirable. Examples of soluble salts that may be added to the electrolyte are lithium bromide, sodium bromide, magnesium bromide, magnesium chloride, strontium bromide, calcium bromide and ammonium bromide.

It is also desirable to include in the electrolyte one or more alkali metal, alkaline earth metal (including magnesium), or ammonium salts of chromic acid in corrosion-inhibiting amounts. The chromic acid salts may be used in proportions between 0.01 gram per liter of solution to concentrations producing saturation in the presence of the electrolyte salt contained therein. A preferred concentration of lithium chromate is about 0.05 to 2.0 grams per liter of solution. Examples of corrosion-inhibiting salts are sodium chromate, ammonium chromate, potassium dichromate, lithium dichromate, magnesium chromate, and calcium chromate.

For certain applications, principally where a long shelf life is required, it is desirable to omit one of the essential components of the primary cell until the need for electrical energy has arisen. The primary cells of the invention are particularly adaptable to be prepared as reserve cells, for example, by omitting the electrolyte until just prior to use.

*The cathode.*—The cathode includes an organic oxidizing substance in which the oxidizing properties are due at least in part to positive halogens combined in said substance. The halogens include chlorine, bromine and iodine. These substances are also referred to as positive halogen organic compounds. During the electrochemical action, the substance undergoes a reduction as the primary cell furnishes electric current.

An organic oxidizing substance containing positive halogens, when treated with water yields hypohalous acid, a powerful oxidizing agent, of the form HOX, where X designates any one of the following halogen group: chlorine, bromine and iodine. Thus a test for a positive halogen comprises reacting the material in question with an acidified aqueous solution of an iodide compound which is oxidized by the hypohalous acid liberated by the reaction of the substance with water, liberating iodine. For example, the following equations illustrate the release of iodine by a reaction between water, N,N dichloromethylamine, and hydrogen iodide:

$$(CH_3)_2NCl_2 + 2HOH \rightarrow (CH_3)_2NH_2 + 2HOCl$$
$$2HOCl + 4HI \rightarrow 2I_2 + 2HCl + 2HOH$$

Some of the positive halogen organic compounds are relatively insoluble in conventional electrolytes and are particularly suitable as cathode materials in dry cells. Some of the insoluble positive halogen organic compounds are also liquids which are immiscible with the electrolyte and can be adsorbed by a material such as acetylene black or graphite. Some of the positive halogen organic compounds may be soluble in the cell electrolyte. These substances may be used in reserve-cells.

The following list includes some of the positive halogen organic compounds which are useful in preparing the primary cell according to the invention. The members of the list are intended as examples only. In the list, X is meant to refer to a halogen atom, such as chlorine, bromine or iodine.

A. Amines of the general formula RNHX, RNX$_2$, R$_2$NX where R is an alkyl radical. A typical example of this class is: N,N dichloromethylamine.
B. Amides:
   1. Carboxylic acid amides—
      (*a*) Aliphatic monocarboxylic acid amides:
         N-chloroacetamide
         N-bromoacetamide
      (*b*) Aliphatic dicarboxylic acid amides:
         N,N'-dibromosuccinamide
         N,N'-dibromooxamide
         N,N'-dibromoadipamide
      (*c*) Aromatic monocarboxylic acid amide:
         N-bromobenzamide
      (*d*) Aromatic dicarboxylic acid amides:
         N,N'-dibromoterphthalamide
   2. Sulfonic acid amides of the formula RSOONHX and RSOOHX$_2$—
      Sodium salt of N-chlorobenzenesulfonamide
      Sodium salt of N-chloro-p-toluenesulfonamide
      N,N-dichloro-p-toluenesulfonamide and N,N-dibromo-p-toluenesulfonamide
      N,N-dichlorobenzenesulfonamide and N,N-dibromo-p-benzenesulfonamide
      N,N-dichloro-p-carboxylic acid-benzene-sulfonamide
   3. Derivatives of carbonic acid amides—
      N,N'-dichlorobiuret and dibromobiuret
C. Imides derived from dibasic acids:
   N-chlorosuccinimide
   N-bromosuccinimide
   N-bromophthalimide
   Ethyl-N-bromophthalimide
D. Quinone imides:
   N,2,6-trichloro-p-quinoneimine
   N-chloro-p-quinoneimine
E. Cyclic ureides:
   N-monochloro and monobromo dimethylhydantoin
   N,N'-dichloro and dibromodimethylhydantoin
   N,N' dichloro and dibromodiphenylhydantoin
F. Amidines of carbonic acid:
   Trichloromelamine and tribromomelamine
   Hexachloromelamine
   Penta and tetra chloromelamines—these are mixtures of trichloro and hexachlormelamines
   N,N' dichloroazodicarbonamidine
   Trichloroisocyanuric acid
   N-chloroacetoguanamine
   N-chloropropoguanamine
   N-chlorodicyandiamide
G. Pyrrolidones
   Polyvinyl pyrrolidone with 10% iodine Any positive halogen organic compound may be used as cathodes of the primary cells of the invention. The primary cells of the invention all utilize the electron change obtained in converting a positive halogen ion to a negative halogen ion. This is shown schematically by the following equation where X is a halogen:

$$X^+ + 2e^- \rightarrow X^-$$

In addition, such compounds may have other radicals in their structure which alter their physical and chemical properties to affect the stability and solubility in the electrolyte. It is also recognized that by changing the structure of the positive halogen organic compounds, the theoretical capacity, shelf life and the rate at which electrical energy can be withdrawn from the cell can be altered. The selection of the particular compound and its structure will depend on the application for which the particular primary cell is intended. The utility of the positive halogen organic compound may be further enhanced by the presence of oxidizing radicals such as nitro, azo, etc. groups which will increase the theoretical capacity. The cathodes of the primary cells of the invention may also comprise a mixture of one or more positive halogen organic compounds, or a mixture with one or more other organic oxidizing compounds, such as quinones, or certain organic azo compounds, or with inorganic cathode materials such as manganese dioxide or the like.

For many situations, it is desirable to increase the electrical conductivity of the cathode. One may add varying proportions of non-reactive conductive materials to obtain the desired electrical conductivity. Carbon is a preferred material for this purpose because of its low cost and easy availability. Any of the various forms of carbon, such as graphite or acetylene black may be used. The conducting material may comprise up to 80% by weight of the cathode mix.

The cathodes of the invention may be fabricated by a number of methods and in various shapes. Example 1 describes preparing a mixture of powders with electrolyte and then pressing a quantity of the mixture to the desired shape and density. Another cathode mix may include a binder such as polyvinyl alcohol, carboxymethylcellulose, methylcellulose, a vinyl resin, bentonite or silica gel. Such mix may be pressed as described above, or cast in a mold to fabricate the cathode. The binder adds strength and rigidity to the cathode especially where odd shapes are used. A cathode mix containing a binder may be coated on a suitable support such as a carbon rod or block and used in layer forms. Besides simple coatings, films containing the cathode mix may also be prepared by the addition of a film-forming material to the cathode mix and using techniques well-known in the plastics art. One technique is to coat paper separator sheets with magnesium powder in a binder on one surface and the cathode mix in a binder on the other surface. The coated sheets may then be stacked and stamped to produce batteries of the desired voltage and geometry.

Many of the positive halogen organic compounds used in the cathodes of the invention melt at relatively low temperatures without decomposition. N,N' dichlorodimethylhydantoin, for example, melts at 130° C. The cathode mix may be prepared by mixing the dry powders, fusing and then pulverizing the fused product. The pulverized product may then be fabricated into cathodes by one of the methods described above. By another method and upon fusion, the cathode mix may be cast directly to the desired shape either in a mold or directly in the place where it is to be used.

In some cases, it is desirable to increase the amount of active surface on the cathode. One method for increasing the active surface is to add a proportion of a soluble material, such as sodium chloride, to the cathode mix before fabrication. Upon fabrication, the soluble material is dissolved out of the cathode leaving a somewhat porous structure with a greatly increased proportion of active surface.

The presence of atmospheric oxygen enhances the capacity of the cathode of cells of various kinds. For example, capacity increases can be realized in the cells of Figure 1 by providing a small vent (e. g., 0.05 inch in diameter) in the wax layer 22 by preparing a tab on the washer 20 which tab 20 extends up through the wax seal 22. The maximum effect is ordinarily obtained when the current drain is relatively light.

It is noteworthy that the materials used to fabricate the cells of the invention may all be produced in the United States by processes well known in the chemical arts. Magnesium may be produced from sea water which is in abundant supply in the United States. The positive halogen organic compounds may be produced synthetically and many such substances such as N,N' dichlorodimethylhydantoin, are commercially available at the present time. Graphite and acetylene black are also available from sources within the United States.

*Example 2.*—A reserve cell may be prepared as follows. Prepare a cathode mix of the following ingredients:

20 grams N,N' dichlorodimethylhydantoin
10 grams graphite

Heat this mixture until it is molten (about 140° C.), pour the molten mass into a paper lined can (I. D. 0.395"—height 1.824"), insert a carbon rod, and then allow the mass to solidify. Upon cooling remove the solid mass from the can, wrap with a piece of absorbent non-woven fabric material. Then place a piece of 0.012" thick magnesium sheet around the assembly and bind with a wire. The assembly has the following approximate size: height: 1.25", diameter: 0.50", volume: 0.25 cu. in; and the following weights: carbon rod: 1.3 g., cathode material: 0.7 g., cell (dry): 4.0 g., cell (wet): 5.0 g. This cell may be stored for a long period of time and when desired for use is immersed in an aqueous solution containing 250 grams $MgBr_2 \cdot 6H_2O$ and 1.0 gram $Na_2Cr_2O_7$ per liter of water. Referring to Figure 3, the reserve cell of Example 2 exhibits an operating voltage of over 2.0 volts over a wide range of current densities. The capacity of the cell is summarized in Table II:

*Table II*

| Discharge Current (amps.) | Average Voltage (volts) | Watt-Min./cm.$^3$ | Watt-Min./g. (wet) | Watt-Hrs./lb. (wet) |
| --- | --- | --- | --- | --- |
| 0.020 | 2.04 | 3.2 | 2.6 | 19.5 |
| 0.050 | 2.00 | 1.9 | 1.7 | 12.7 |
| 0.100 | 1.91 | 1.3 | 1.0 | 7.7 |
| 0.200 | 1.87 | 1.1 | 0.9 | 6.7 |

Referring to Figure 4, a reserve cell according to Example 2 and activated with a solution containing 500 g. of $MgBr_2 \cdot 6H_2O$ per liter of water (curve 51) and tap water (curve 53) is compared with a similar cell prepared with a zinc anode and activated with a solution containing 500 g. of $MgBr_2 \cdot 6H_2O/1$ of water (curve 55) and tap water (curve 57). The cells of Figure 4 were stored for 10 weeks in a desiccator at room temperature prior to activation. Upon activation, the cells were discharged continuously at 20 ma. Both a magnesium bromide solution and tap water are satisfactory electrolytes for the cells of the invention. A similar cell having a zinc anode under similar conditions exhibits a lower voltage and a steeper discharge curve.

*Example 3.*—A flat primary cell which operates at very high discharge rates may be prepared by first mixing the following ingredients to prepare a cathode mix:

10.0 grams N,N' dichlorodimethylhydantoin
5.0 grams acetylene black
26 ml. aqueous solution containing 500 grams of $MgBr_2 \cdot 6H_2O$ and 1.0 grams $Li_2CrO_4 \cdot 2H_2O$ per liter of water Paste a quantity of the cathode mix to a graphite plate about 1.25" x 1.00" x 0.0625" thick and weighing about 2.0 grams. The cathode is wrapped with a piece of salt free kraft paper and then wrapped with a magnesium sheet about 3.0" x 1.0" x 0.010" thick weighing about 1.0 gram. This assembly may be stored for a time and, when electric current is desired, is immersed in an aqueous solution containing 500 grams $MgBr_2 \cdot 6H_2O$ and 1.0 gram $Li_2CrO_4 \cdot 2H_2O$ per liter of water. The cell weighs about 10 grams after immersion and occupies about 0.311 cu. in. Figure 5 shows characteristic discharge curves of this cell under various conditions of drain. The capacity is summarized in Table III.

*Table III*

| Discharge Current (amps.) | Average Voltage (volts) | Watt-Min./cm.$^3$ | Watt-Min./g. | Watt-Hrs./lb. |
| --- | --- | --- | --- | --- |
| 0.250 | 2.11 | 12.1 | 6.2 | 46.8 |
| 0.500 | 2.04 | 7.8 | 4.0 | 30.4 |
| 1.000 | 1.92 | 5.3 | 2.7 | 20.4 |
| 2.00 | 1.78 | 1.1 | 0.6 | 4.5 |

*Example 4.*—Another dry cell of the invention may be prepared according to Example 1 except that the anode is alloy AZ10A (Table I) and the cathode mix comprises the following formulation:

30 grams trichloromelamine
15 grams acetylene black
2.25 grams barium chromate
60 ml. distilled water The characteristic discharge curve of the cell when discharged continuously through a 50 ohm resistance is illustrated in Figure 6, curve 71.

*Example 5.*—Another dry cell of the invention may be prepared according to Example 1 except that the anode is alloy AZ10A (Table I) and the cathode mix comprises the following formulation:

11.2 grams hexachloromelamine
5.6 grams acetylene black
0.5 grams barium chromate
32 ml. distilled water The discharge characteristic of the cell when discharged continuously through a 50 ohm resistance is illustrated in Figure 6, curve 73.

*Example 6.*—Another dry cell of the invention may be prepared according to Example 1 except that the anode is alloy AZ10A (Table I) and the cathode mix comprises the following formulation:

22 grams N,N' dichloroazodicarbonamidine
11 grams acetylene black
0.99 gram barium chromate
39 ml. aqueous solution containing 500 grams of MgBr·6H$_2$O and 1.0 grams of LiCrO$_4$·2H$_2$O per liter of water The discharge characteristic of the cell when discharged continuously through a 50 ohm resistance is illustrated in Figure 6, curve 75.

*Example 7.*—Another reserve cell of the invention may be prepared according to Example 3 except that the following cathode mix is pasted on the graphite plate and then dried:

20 grams of N,N-dichlorobenzenesulfonamide
10 grams acetylene black
40 ml. solution containing 5% by weight of cellulose acetate in acetone

*Example 8.*—Another dry cell of the invention may be prepared according to Example 1 except that the cathode mix comprises the following formulation which includes a mixture of organic oxidizing substances:

52.25 g. of N,N-dichlorobenzenesulfonamide
52.25 g. of N.N'-dichlorodimethylhydantoin
10.5 g. of acetylene black
10.5 g. of graphite
40 ml. aqueous solution containing 0.2 gram sodium dichromate per liter of water The cell exhibits characteristics similar to the cell of Example 1.

*Example 9.*—Another dry cell of the invention may be prepared according to Example 1 except that the cathode mix comprises the following formulation which includes a mixture of organic oxidizing substances:

20 grams N,N' dichlorodimethylhydantoin
20 grams m-dinitrobenzene
20 grams acetylene black
80 ml. aqueous solution containing 500 grams of MgBr$_2$·6H$_2$O and 1.0 gram LiCrO$_4$·2H$_2$O per liter of water

*Example 10.*—Another dry cell of the invention may be prepared according to Example 1 except that the cathode mix comprises the following formulation which includes a mixture of 52.25 grams N,N' dichlorobenzenesulfonamide
52.25 grams manganese dioxide
10.5 grams acetylene black
10.5 grams graphite
40 ml. aqueous solution containing 0.2 gram sodium dichromate per liter of water There have been described improved primary cells which are inexpensive to manufacture and exhibit a high watt-hour and ampere-hour capacity per unit or value of watt and a high flat operating voltage level over a wide range of current drains. The cells of the invention use materials which may be produced within the United States in large quantities by techniques well known in the chemical art.

What is claimed is:

1. In a primary cell utilizing the electron change obtained in converting a positive halogen ion to a negative halogen ion, an anode selected from the group consisting of magnesium and magnesium base alloys in combination with a cathode including a depolarizer including an organic oxidizing compound in which the oxidizing properties of said susbtance are due at least in part to positive halogens chemically combined in said compound, said compound being selected from the group consisting of amines of the general formula RNHX, RNX$_2$, R$_2$NX, where R is an alkyl radical and X is a halogen atom, imides derived from dibasic acids, cyclic ureides, carboxylic acid amides, sulfonic acid amides, derivatives of carbonic acid amides, and amidines of carbonic acid.

2. A primary cell according to claim 1 wherein said anode comprises a magnesium base alloy.

3. A primary cell according to claim 1 wherein said cathode comprises a mixture of different organic oxidizing compounds in which the oxidizing properties of at least one of said compounds are due at least in part to positive halogens chemically combined in said compounds.

4. A primary cell according to claim 1 wherein said cathode includes an inorganic depolarizer.

5. A primary cell according to claim 1 wherein said cathode includes an inorganic material for increasing the electrical conductivity of said cathode.

6. A primary cell utilizing the electron change obtained in converting a positive halogen ion to a negative halogen ion comprising a magnesium anode, an electrolyte, and a cathode including a depolarizer including an organic oxidizing compound in which the oxidizing properties are due at least in part to positive halogens chemically combined in said compound, said compound being selected from the group consisting of amines of the general formula RNHX, RNX$_2$, R$_2$NX, where R is an alkyl radical and X is a halogen atom, imides derived from dibasic acids, cyclic ureides, carboxylic acid amides, sulfonic acid amides, derivatives of carbonic acid amides, and amidines of carbonic acid.

7. A primary cell according to claim 6 wherein said electrolyte is an aqueous solution having dissolved therein a compound selected from the group consisting of alkali metal bromides, alkaline earth metal bromides, and ammonium bromides.

8. A primary cell according to claim 6 wherein said electrolyte is an aqueous solution having dissolved therein a chromic acid salt of an anion selected from the group consisting of alkali bases, alkaline earth metal bases and ammonium bases.

9. A primary cell utilizing the electron change obtained in converting a positive halogen ion to a negative halogen ion comprising a magnesium-base alloy anode, an aqueous electrolyte having dissolved therein magnesium bromide and a chromate inhibitor, and a cathode comprising carbon and an organic oxidizing compound in which the oxidizing properties are due at least in part to positive halogens chemically combined in said compound, said compound being selected from the group consisting amines of the general formula RNHX, RNX$_2$, R$_2$NX, where R is an alkyl radical and X is a halogen atom, imides derived from dibasic acids, cyclic ureides, carboxylic acid amides, sulfonic acid amides, derivatives of carbonic acid amides, and amidines of carbonic acid.

10. A primary cell including a magnesium anode, an aqueous electrolyte and a cathode including N,N'-dichlorodimethylhydantoin.

11. A primary cell including a magnesium anode, an aqueous electrolyte and a cathode including N,N'-dichloro-p-toluene sulfonamide.

12. A primary cell including a magnesium anode, an aqueous electrolyte and a cathode including hexachloromelamine.

13. A primary cell including a magnesium anode, an aqueous electrolyte and a cathode including N,N'-dichloroazodicarbonamidine.

References Cited in the file of this patent

UNITED STATES PATENTS

| | | |
|---|---|---|
| 2,306,927 | Arsem | Dec. 29, 1942 |
| 2,343,194 | Lawson | Feb. 29, 1944 |
| 2,612,533 | Blake | Sept. 30, 1952 |